2,806,008
Patented Sept. 10, 1957

2,806,008

EMULSION COATING COMPOSITION CONTAINING A SYNTHETIC RESIN, WOOD FLOUR, AND PLASTER OF PARIS

Joseph D. McNulty, Maple Park, Ill., and Emil A. Wich, Plainfield, N. J.

No Drawing. Application May 18, 1953,
Serial No. 355,886

5 Claims. (Cl. 260—17.4)

This invention relates to a coating composition to be applied over plaster, plaster board, stone, metal, wood or the like. More particularly, the coating composition of this invention may be applied as a relatively thick layer for filling holes or depressions in the underlying material, for smoothing out irregular, coarse or grainy surfaces, for filleting or otherwise changing the contours of various structures and for like purposes.

Coating compositions of the type indicated are known but suffer from one or more of the defects mentioned hereinbelow. Thus, some such coating compositions do not have the proper body or consistency of dry or set too rapidly for easy application. Many coating compositions, when drying after application as a heavy layer, tend to shrink or contract or crack or wrinkle. Other coating compositions are characterized by a coarse or grainy surface structure. Still other coating compositions, when dried, are not sufficiently hard or not sufficiently cohesive to withstand even a reasonable amount of handling or abrasion or mechanical impact without damage. Other coating compositions do not adhere well to the underlying surface and are easily detached therefrom. Still other coating compositions are too permeable to water or lacking in resistance against water, soap, certain of the commonly used organic solvent, acids, light or variations in temperature, with resultant deterioration or exposure to such agents.

We have now provided a coating composition adapted to be used for the above mentioned purposes and comprising a mixture of wood flour with plaster of Paris dispersed in an emulsion comprising a solution of a synthetic thermoplastic resin dispersed in water. Our novel composition can easily be applied as a heavy layer, and, when so applied, dries or sets due to two concurrent actions, viz. the setting of the plaster of Paris (with formation of gypsum) and the evaporation of part of the water and of the resin solvent. Such drying or setting takes place without shrinkage or distortion and the resulting coating is characterized by smooth, even texture and surface, strength, good adhesion, imperviousness and good resistance against water, soap, certain of the commonly used organic solvents, acids and many other desirable qualities.

It is, therefore, an important object of the present invention to provide an improved plastic coating composition that can easily be applied as a thick layer over an irregular or indented or coarse or grainy surface to form a strong and durable coating that is outwardly smooth or even instead of conforming to the underlying surface.

Another important object of the present invention is to provide a coating composition of the type indicated in the preceding paragraph characterized by imperviousness to water and good resistance against dampness, soaps, alkaline and acid agents, molds and various agents to which such coatings may be exposed.

A critically important feature of the present invention is the inclusion with the coating composition of both plaster of Paris and wood flour or other equivalent finely divided cellulosic material. Wood flour, by itself and without the plaster of Paris, yields a coat that is too grainy, not sufficiently smooth and excessively soft. Plaster of Paris, by itself and without the wood flour, must be employed in large amounts (if the plastic coating composition is to have the required body and consistency), with the result that the dried or set coat will be lacking in strength or cohesiveness. Other materials than wood flour, such as clays, vermiculite, perlite and the like, do not yield satisfactory results, whether or not combined with plastic of Paris.

From 1½ to 4 parts (by weight) of plaster of Paris may be used for each part of wood flour. The preferred ratio is two parts of plaster of Paris for each part of wood flour.

Any of the commercially available wood flours may be used preferably of 100 to 200 mesh fineness.

The plaster of Paris should be free from fibrous material (wood or hair or the like), such as is sometimes incorporated with commercial plaster of Paris. Further, the plaster of Paris should include a retarder so that its setting time will range from about 2 to about 3 hours. Such retarders are conventionally used for the purpose indicated. One such retarder is made up of alkali treated proteinanceous material, in particular, hair or hides reacted with lime and then degraded with caustic soda. Since such retarders are well known, they are not described in detail in this application. The exact amount of retarder to be used will vary somewhat with the specific retarder employed, the origin and method of preparation of the plaster of Paris, the nature of the water added to the plaster to cause the plaster to set, the temperature at which setting takes place, and the like. The manner of adjusting the amount of retarder to secure the desired setting time being well known to those skilled in the art, there is no need to explain such adjustment herein. It may be noted, however, that about 6 to 10 lbs. of retarder is often added to 1 ton of plaster of Paris. The plaster of Paris is suitably ground to a fineness such that 75% of the plaster will pass a 325 mesh screen.

The synthetic resin forming a part of our novel coating composition is selected from the vinyl, acryl and styrene polymers and copolymers and mixtures thereof. Examples of such resins are: Vinyl chloride acetate copolymers of various molecular weights and percentages; poly vinyl acetate; poly vinyl chloride; the ethyl, n-propyl, n-butyl or isobutyl methyl methacrylate. Preferably, we employ a mixture of a relatively hard and non-tacky resin with a relatively soft and tacky resin, in order to render the coating composition suitably adhesive. By way of a relatively hard, non-tacky resin, we may use a vinyl acetate chloride copolymer, polymerized methacrylate or polymerized styrene. By way of a relatively soft tacky resin, we may use an acrylic ester-styrene-drying oil copolymer. Ordinarily, a preponderant amount of a relatively hard non-tacky resin is used along with just enough relatively soft and tacky resin to effect the desired adhesiveness. Naturally, the ratio between the two types of resin will vary according to the specific resins employed. The adjustment of this ratio, however, is within the skill of the art. When vinyl acetate chloride copolymer is combined with an acrylic ester-styrene-drying oil copolymer, we use from 5 to 10 parts (by weight) of the first mentioned resin in combination with from 3.5 to 6 parts of the second resin.

We can also employ one of the above disclosed relatively hard and non-tacky resins in combination with a plasticizer such as triglycol di-2-ethylbutyrate; butoxyglycol phthalate; tricresyl phosphate; or chlorinated paraffin. In such cases, enough plasticizer is added for effecting suitable plasticity, which of course will vary slightly with the particular composition employed and can be determined with ease.

From 8.5 to 22 parts (by weight) of resin may be used with from 21 to 10 parts of said mixture of wood flour with plaster of Paris.

The resins are dissolved in a solvent preferably made up of a mixture of a high boiling hydrocarbon, such as mineral spirits or xylene, with a high boiling ketone such as isophorone or methylamyl ketone. From 29.5 to 30 parts (by weight) of mineral spirits may be combined with from 14 to 20 parts of isophorone. From 43.5 to 56 parts of solvent mixture may be employed with from 8.5 to 16 parts of resin mixture. Other available solvents include acetone; mixtures of acetone with toluene; n-butyl acetate; ethyl acetate; dioxane; methyl isobutyl ketone; mixtures of methyl isobutyl ketone with a liquid hydrocarbon; mixtures of mesityl oxide with toluene; and the like.

With the above disclosed ingredients, we use from 27 to 18 parts (by weight) of water in combination with from 21 to 10 parts of said wood flour-plaster of Paris mixture. With this water we incorporate an emulsifying agent in sufficient amount (0.01 to 0.05 part by weight) to emulsify the resin solution in the water. The particular emulsifying agent used is not only one that will make the resin solution the dispersed phase but also one that will evaporate or be hydrolyzed and thus disappear when the coating composition sets or dries. Such emulsifying agents are known in the art and include, for instance, higher fatty acid soaps of ammonia or morpholine, such as ammonium linoleate or ricinoleate or morpholine oleate; ammonium salts of alkyl naphthalene sulfonic acids; and the like.

In preparing our coating composition, we may dissolve the resin in the solvent mixture and emulsify the resin solution in the water containing the emulsifying agent, and then add the wood flour and the plaster of Paris.

In our coating composition, the proportions of water, solvent, resin and wood flour-plaster of Paris mixture is so adjusted as to yield a mass of more or less putty-like or thinner consistency easily applied by plastering tools. These proportions can obviously be varied, for instance, as the ratio of resin to wood flour-plaster of Paris mixture is changed.

If desired, a pigment or other coloring matter can be incorporated with our coating composition. Plasticizers for the resin can also be added.

The following proportions are recommended for the ingredients tabulated hereinbelow:

| Ingredients | Parts by Weight |
|---|---|
| Vinyl acetate chloride copolymer | 5 to 10 |
| 50% solution in mineral spirits of an acrylic ester-styrene-drying oil copolymer | 7 to 12 |
| Isophorone | 14 to 20 |
| Mineral spirits | 26 to 30 |
| Emulsifying agent (morpholine oleate) | 0.01 to 0.05 |
| Water | 27 to 18 |
| Wood flour-plaster of Paris mixture | 21 to 10 |

By way of a specific example, we may dissolve 5 parts by weight vinyl acetate chloride copolymer and 7 parts of a 50% solution in mineral spirits of an acrylic ester-styrene-drying oil copolymer in a mixture of 16 parts isophorone and 26 parts mineral spirits. The resulting solution is then emulsified in 8.6 parts water containing 0.05 parts morpholine oleate. To this emulsion, we add 16.5 parts of plaster of Paris, 16.5 parts of water and 10 parts of wood flour.

The above mentioned acrylic ester-styrene-drying oil copolymer may be prepared by reacting together at an elevated temperature acrylic esters such as methyl, ethyl, propyl or butyl methacrylates, monomeric styrenes such as alpha methyl styrene monomer or styrene monomer, and a drying oil such as dehydrated castor oil, linseed oil, tung oil and the like. Organic peroxides may be used as catalysts, for instance, cumene hydroperoxide or ditertiary butyl peroxide or benzoyl peroxide.

A specific example of the preparation of such a copolymer is given as follows:

| | Pounds |
|---|---|
| Dehydrated castor oil | 400.0 |
| Butyl methacrylate monomer | 200.0 |
| Alpha methyl styrene monomer | 150.0 |
| Styrene monomer | 250.0 |
| Cumene hydroperoxide | 2.25 |
| Ditertiary butyl peroxide | 2.25 |

The dehydrated castor oil is placed into a reaction vessel equipped for heating and cooling the reaction mixture, also agitator and reflux condenser. The butyl methacrylate and alpha methyl styrene monomer are added and mixed with oil. The mixture is heated to 280° F. over a period of two hours. Then the styrene monomer containing the cumene hydroperoxide and the dietertiary butyl peroxide is carefully added over a period of four hours and a temperature of 280-300° F. maintained by cooling and heating. The mixture is held at this temperature until 90% of the monomers are polymerized. The batch is then cooled to 200° F. and diluted with mineral spirits to a 50% solution.

Similar products have been obtained by substituting other styrene monomers, other methacrylates and other dry oils for those specifically mentioned in the above given illustrative example.

The coaction of the various ingredients of our novel coating compositions will become apparent from the following discussion. In the coating composition, the resin solution apparently coats the plaster particles and thus separates the plaster particles from the water. This is evidenced by the surprising fact that our coating compositions do not set in the containers but keep indefinitely without setting when tightly sealed. Drying or setting takes place only after the coating composition has been applied or when the open container is exposed to air for a considerable length of time. Further, on application, the evaporation of the resin solvent is retarded due to the fact that the resin solution is dispersed in the water. To this slow evaporation of the resin solvent we attribute the fact that our coating compositions do not develop a dried surface layer on working or application but retain their desirable plastic properties for a matter of several hours, and also dry or set, apparently, at about the same rate throughout the thickness of the applied layer. Further, on drying or setting of our compositions, the plaster expands slightly, and part of the water combines with the plaster to form gypsum. This combined water is retained in the coat. This may be the reason why our coating compositions do not shrink or contract on drying or setting, even though the resin solvent and part of the water are lost by evaporation. The imperviousness and resistance to water of the dried or set coat may be due, at least in part, to the fact that the volatile portion of the emulsifying agent is removed as the coating compositions set or dry and the fact that the dried or set coat is made up of wood flour and gypsum particles bonded together with resin. Such a structure should be mechanically strong, as is actually the case with the coats formed by our novel composition.

Thus, the solids content of our novel compositions comprises wood flour and plaster of Paris together with a solvent soluble synthetic thermoplastic resin. The wood flour and plaster together contribute the body and plastic consistency required for application as a relatively thick layer and, in combination, form a comparatively smooth and finely textured coat. The bonding of the wood flour and plaster particles to each other and to the underlying surface is effected by the resin. The volatile content of our novel compositions includes both water and resin solvent together with an emulsifying agent for dispersing the solvent in the water. The water forming the outer phase of the emulsion retards the evaporation of the resin solvent, so that the plastic qualities of the coating compositions are retained and no superficial skins or films are formed.

It will thus be noted that the particular combination of materials that we employ yields coating compositions distinguished by a number of desirable properties not found together in any heretofore available coating composition. One of the most important of these properties is the applicability of our novel compositions for coating a great variety of materials, including those enumerated hereinabove. As a result, it is in some instances possible to change radically the methods of finishing heretofore employed in some arts, as illustrated by the example given hereinbelow.

Up to the present time, the method of plastering walls usually involved four steps: (1) initial application of a "scratch coat"; (2) application of a "brown coat"; (3) application of a "finish coat" of lime and gauging plaster; and (4) painting or decorating. Our novel composition can be applied directly to the "brown coat," eliminating the need for any subsequent plastering and painting or decorating if the composition is colored with suitable pigments or coloring materials. When so applied, our coating composition forms a smooth and even outer surface that is impervious to water and thoroughly resistant against dampness, soap, acids, certain commonly used organic solvents, cleaning agents and the like. Unlike the conventional "finish coat," our coating material will not spall or flake off. As mentioned above, our coating composition can be colored as desired, so that no paint need be applied whatever on an interior wall surface. Thus the need for the painting of a plastered wall is eliminated. For outdoor exposure, the coat should be covered with paint, resinous lacquer or the like.

Many details of composition may be varied within a wide range without departing from the principles of our invention and it is, therefore, not our purpose to limit the patent granted on this invention otherwise than necessitated by the scope of the appended claims.

We claim as our invention:

1. A plastic coating composition capable of keeping without setting in tightly sealed containers, said composition consisting essentially of from 21 to 10 parts by weight of a mixture of wood flour with plaster of Paris, the ratio of wood flour to plaster of Paris in said mixture ranging from 1:1½ to 1:4; a resin solution immiscible with water consisting essentially of from 8.5 to 16 parts of a water insoluble thermoplastic resin selected from the group consisting of the homopolymers of vinyl acetate and of vinyl chloride, the copolymers of vinyl acetate with vinyl chloride, the homopolymers of the lower alkyl methacrylates, the homopolymers of styrene, the copolymers of a lower alkyl methacrylate with styrene and a drying oil, and mixtures thereof, said resin being dissolved in from 43.5 to 56 parts of a volatile organic solvent which is eliminated on drying of said composition; from 27 to 18 parts of water; and an effective amount of an emulsifying agent for dispersing in said water both said resin solution and said plaster, said resin solution then coating said plaster particles and thereby separating said plaster particles from said water to make possible the said keeping of said compoistion without setting.

2. A composition according to claim 1 in which said resin component includes a copolymer of a lower alkyl methacrylate ester, styrene and a drying oil.

3. A composition according to claim 2 in which said resin component includes from 3.5 to 6 parts of said methacrylic ester-styrene-drying oil copolymer.

4. A composition according to claim 3 in which said resin component includes from 5 to 10 parts of vinyl acetate chloride copolymer and said organic solvent comprises from 14 to 20 parts of a high boiling ketone together with from 29.5 to 36 parts of a high boiling hydrocarbon solvent.

5. A composition according to claim 4 in which said emulsifying agent includes a volatile portion which is eliminated on drying of said composition.

References Cited in the file of this patent

UNITED STATES PATENTS

| | | |
|---|---|---|
| 2,238,956 | Strother | Apr. 22, 1941 |
| 2,311,233 | Jaenicke | Feb. 16, 1943 |
| 2,558,378 | Petry | June 26, 1951 |

FOREIGN PATENTS

| | | |
|---|---|---|
| 567,297 | Great Britain | Feb. 7, 1945 |